(12) United States Patent
Kuwabara et al.

(10) Patent No.: US 8,154,551 B2
(45) Date of Patent: Apr. 10, 2012

(54) COORDINATION OPERATION METHOD AND COMMUNICATION TERMINAL

(75) Inventors: Masahiko Kuwabara, Tokyo (JP); Kazuo Aoki, Tokyo (JP); Toshiro Matsumura, Tokyo (JP)

(73) Assignee: Vodafone Group PLC, Newbury, Berkshire (GB)

( * ) Notice: Subject to any disclaimer, the term of this patent is extended or adjusted under 35 U.S.C. 154(b) by 1065 days.

(21) Appl. No.: 11/987,059

(22) Filed: Nov. 27, 2007

(65) Prior Publication Data

US 2008/0108344 A1 May 8, 2008

Related U.S. Application Data

(63) Continuation of application No. PCT/JP2006/309547, filed on May 12, 2006.

(30) Foreign Application Priority Data

May 31, 2005 (JP) ................................. 2005-160021

(51) Int. Cl.
*G06T 11/00* (2006.01)
*G09G 5/22* (2006.01)

(52) U.S. Cl. ...................................... 345/467
(58) Field of Classification Search .................... 345/467
See application file for complete search history.

(56) References Cited

U.S. PATENT DOCUMENTS

| 5,206,904 | A | 4/1993 | Koma |
| 5,471,621 | A | 11/1995 | Ohtsuki |
| 6,922,812 | B2 * | 7/2005 | Broussard et al. ............ 345/467 |
| 2004/0117439 | A1 * | 6/2004 | Levett et al. .................. 709/203 |

FOREIGN PATENT DOCUMENTS

| AU | 651324 | 6/1991 |
| CA | 2032776 | 6/1991 |
| EP | 0 434 071 A2 | 6/1991 |
| JP | 3-190453 | 8/1991 |
| JP | 4-333119 | 11/1992 |
| JP | 2002-259367 | 9/2002 |
| JP | 2002-373074 | 12/2002 |
| JP | 200-46629 | 2/2003 |
| JP | 2003-125076 | 4/2003 |
| JP | 2005-55988 | 3/2005 |

OTHER PUBLICATIONS

Yukikazu Nakamoto; Toward Mobile Phone Linux; Issue Date: Jan. 27-30, 2004; Date of Current Version: Oct. 4, 2004; Design Automation Conference, 2004. Proceedings of the ASP-DAC 2004. Asia and South Pacific; pp. 117-124.*
Robert W. Scheifler and Jim Gettys; The X Window System; Apr. 1986; Journal ACM Transactions on Graphics (TOG); vol. 5 Issue 2, pp. 79-109.*
Japanese Office Action dated Jun. 2, 2010 (in Japanese).

* cited by examiner

*Primary Examiner* — Jeffery A Brier
(74) *Attorney, Agent, or Firm* — Kratz, Quintos & Hanson, LLP

(57) ABSTRACT

When a character input is necessary during an execution of an engine application $39_k$ in an engine section, a character input processing request section 65 of the engine section issues a character input processing request FRQ depending on a request from the engine application $39_k$. After receiving the character input processing request, a character input processing section 61 of a host section carries out a character input processing, and notifies a character input processing result to the engine section. In the engine section which has received the character input processing result, characters according to the character input processing result are displayed by using character font data in the engine section. As a result, it is possible to make an apparatus structure compact, as well as to improve a convenience for a user.

7 Claims, 15 Drawing Sheets

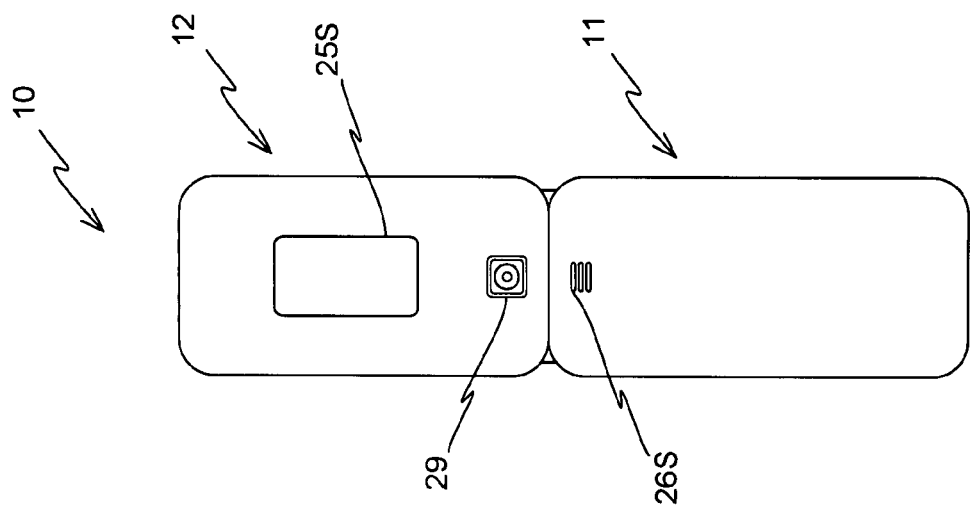
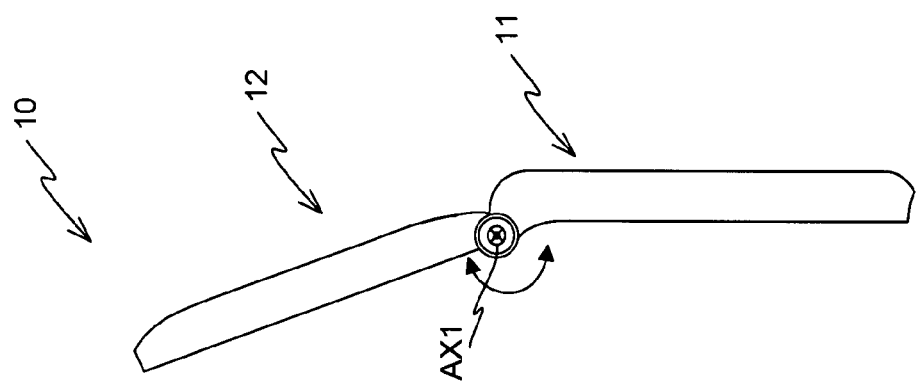
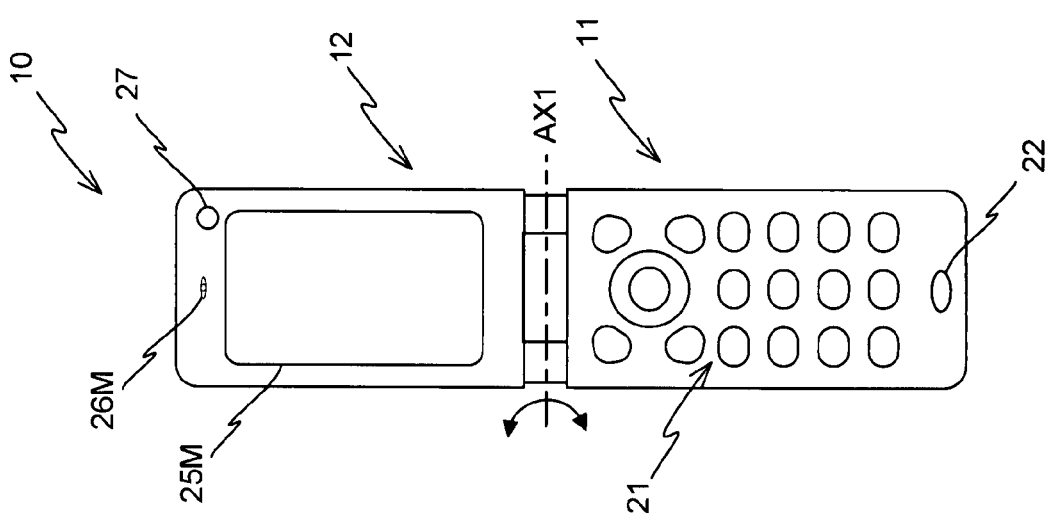

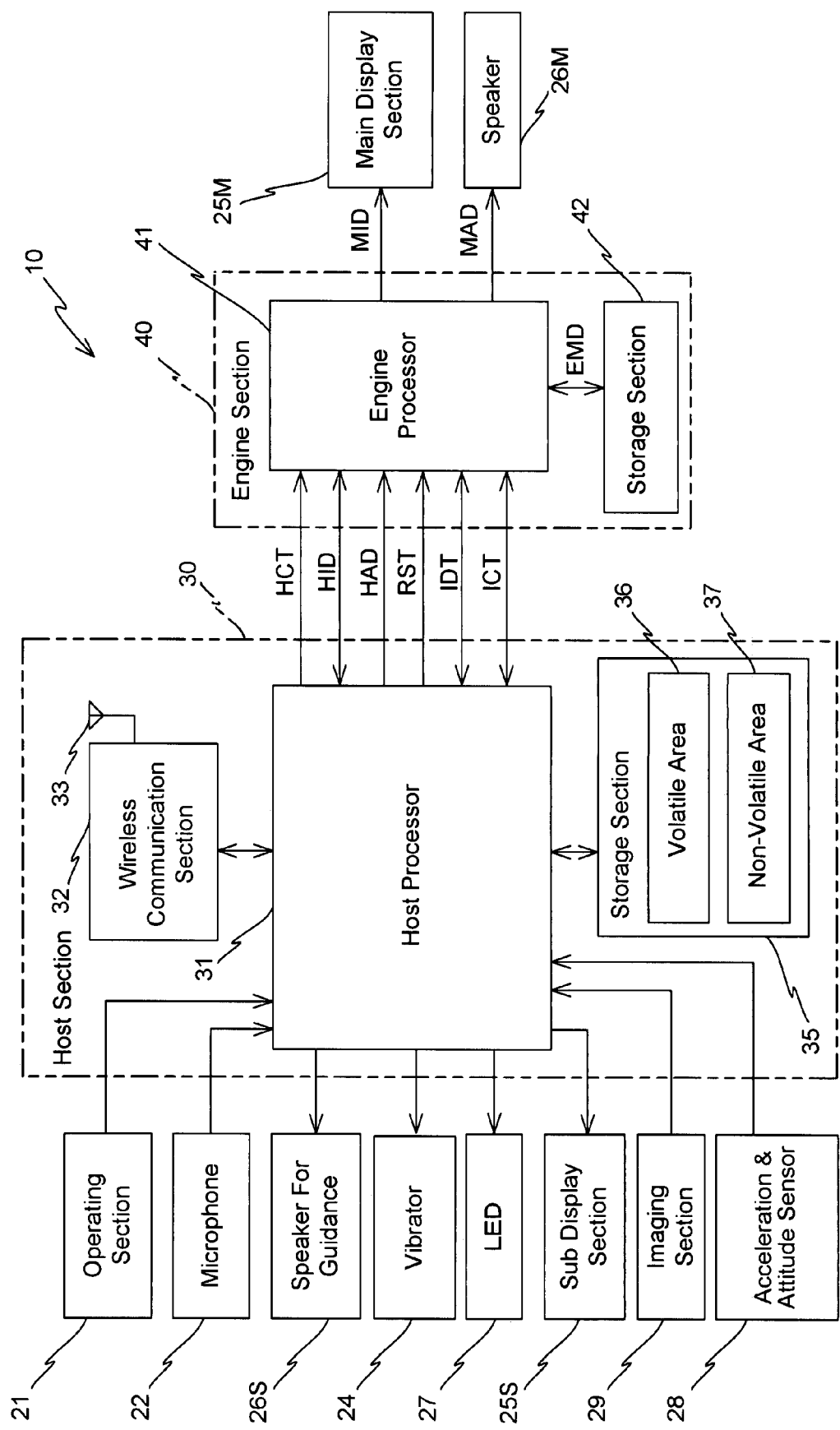

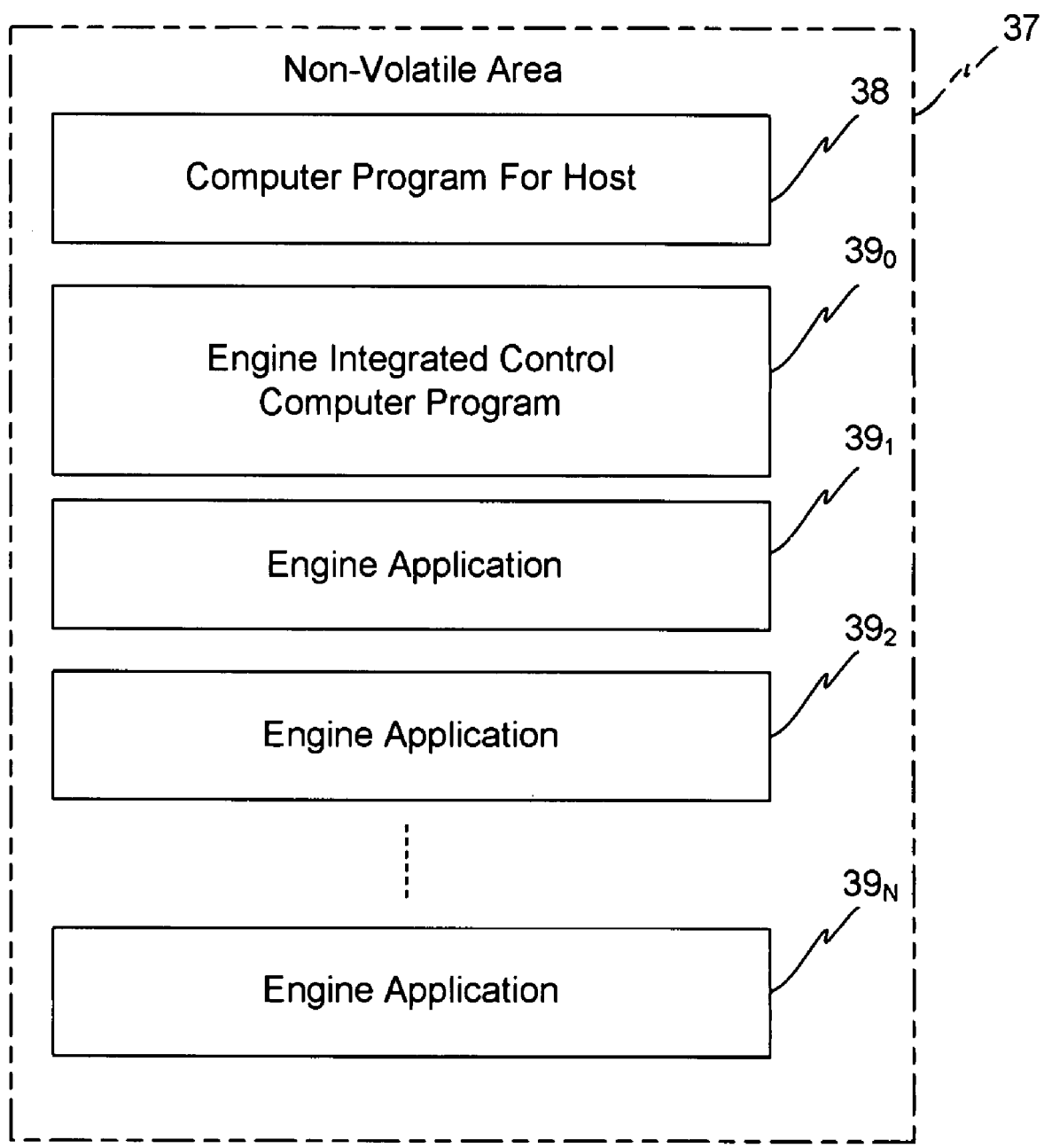

COORDINATION OPERATION METHOD AND COMMUNICATION TERMINAL

RELATED APPLICATION

This is a continuation application of the international patent application No. PCT/JP2006/309547 filed with Application date: May 12, 2006. The present application is based on, and claims priority from, J.P. Application 2005-160021, filed on May 31, 2005, the disclosure of which is hereby incorporated by reference herein its entirety.

BACKGROUND OF THE INVENTION

The present invention relates to a coordination operation method and a communication terminal, and more particularly to a coordination operation method in which, a host section which performs a processing associated with a communication with an outside, and an engine section which executes a predetermined function under a control of the host section, operate in coordination in the communication terminal, and to a communication terminal which uses the coordination operation method.

BACKGROUND ART

Mobile communication terminals such as cellular phones have hitherto been used widely as a communication terminal. There has been a remarkable development in a technology related to the mobile communication terminals, particularly the cellular phone. In addition to a communication function via a mobile communication network which is an essential function as the mobile communication terminal, optional functions for enjoying games and music have also been installed in the mobile communication terminal.

In such mobile communication terminals, there is a built-in processor which performs various data-processing for carrying out the essential functions and the optional functions. Resources such as a storage section, which includes a storage element for storing various computer programs and data, a wireless communication section for performing wireless communication, an operating section for a user to carry out an operation command, and a notifying section (display section and an audio output section) for notifying various information to the user, are connected to this processor. Moreover, by executing the computer program stored in the storage section, and controlling appropriately the resources connected according to the requirement, by the processor, the essential functions and the optional functions are executed.

SUMMARY OF THE INVENTION

As it has been mentioned above, since it is necessary to carry out various functions in the conventional mobile communication terminal, a general purpose processor is adopted for the built-in processor. This is an excellent method from a point of view of letting the communication terminal to have a simple structure, and reducing a size and allowing a low power consumption. However, when the general purpose processor is used, even when an attempt is made to improve a performance in the operation of optional functions for enjoying games and music for example, it has been difficult to facilitate a significant improvement in the performance.

Meanwhile, when compared with the other information processing apparatuses, it can be said that the improvement of performance in the mobile communication terminal is sought for the operation of optional functions. The operation of optional functions for which the improvement in the performance is sought, are concretely, an execution of a game and playing music etc. At the time of the operation of such optional function, particularly, a screen display processing and an audio data output processing, can be said to be exerting a substantial load on the processor.

Moreover, the mobile communication terminal is expected to carry out the essential functions and the optional functions mentioned above, but as a general rule, since there is one user, it has not yet been expected that the essential functions and the optional functions are simultaneously operated individually in any case. For example, even during a time when a communication operation which is an essential function is performed, it has not been expected that a game operation which is an optional function operation is also performed.

For the reasons mentioned above, introducing an engine processor exclusively for optional functions, superior in the screen display processing and the audio data output processing, and making an engine section which includes the engine processor, execute an application corresponding to the operation of the optional functions, under the control of a host section which includes a host processor which is a processor performing the communication operation, can be taken into consideration. It is considered to be essential that the host section and the engine section operate in coordination, while adopting a structure including such host section and engine section, and while suppressing as far as possible a redundancy of components, for constructing the entire apparatus compactly.

For example, when a game application is to be executed in the engine section, at the time of specifying a name etc. of a hero, a character input processing becomes necessary, and even when the engine section is not operating, the character input processing becomes necessary for creating an electronic mail. For the character input processing, a front-end processor which is a computer program for the character input processing is necessary.

For this reason, preparing a front-end processor for the character input processing individually for each of the host section and the engine section is considered. However, when the front-end processor for the character input processing is to be executed in the engine section, in addition to the screen display processing and the audio data output processing, a software configuration in the engine sections becomes complicated, and it is not possible to have a compact structure. Moreover, a processing speed of the screen display processing and the audio data output processing in the engine section have an adverse effect.

The present invention is made in view of the abovementioned circumstances, and it is an object of the present invention to provide a coordination operation method which enables to improve a convenience for a user, while building compactly the overall communication terminal having a structure which includes a host section which includes a host processor and carries out processing associated with a communication with an outside, and an engine section which executes a predetermined function under the control of the host section.

Moreover, it is an object of the present invention to provide a communication terminal having a structure which includes the host section which carries out processing associated with the communication with the outside, and the engine section which carries out the predetermined function under the control of the host section, which enables to build compactly the overall communication terminal, and to improve the convenience for the user.

According to a first aspect, the present invention is a coordination operation method for operating by coordination between a host section which performs a processing associated with a communication with an outside, and an engine section which executes an application under a control of the host section, in a communication terminal, comprising steps of: requesting character input processing at which, the engine section, during execution of the application, makes a request for character input processing; notifying character input processing result at which, the host section which has received the character input processing request, performs the character input processing, and notifies a character input processing result to the engine section; and displaying characters at which, the engine section which has received the character input processing result, uses character font data in the engine section, and displays characters corresponding to the character input processing result.

In this coordination operation method, when a character input is necessary during execution of the application in the engine section, at the step of requesting character input processing, the engine section makes the request for the character input processing to the host section. The host section, upon receiving the character input processing request, performs the character input processing. Moreover, at the step of notifying character input processing result, the host section notifies the character input processing result to the engine section. The engine section which has received the character input processing result, displays characters corresponding to the character input processing result by using the character font data in the engine section, at the step of displaying characters.

In other words, in the coordination operation method of the present invention, the engine section is capable of achieving the character input processing result without installing a front-end processor function for the character input processing. Consequently, according to the coordination operation method of the present invention, it is possible to structure compactly the entire apparatus, as well as to improve the convenience for the user.

In the coordination operation method of the present invention, an arrangement can be made such that at the step of notifying the character input processing result, whenever a key for character input is operated from an operating section which is connected to the host section, the host section notifies result data of the character input processing which has been performed according to the operation of the key, to the engine section.

Moreover, in the coordination operation method of the present invention, an arrangement can be made such that the step of notifying character input processing result includes steps of: processing host character input at which, whenever a key for character input in the operating section which is connected to the host section is operated, the host section displays a result of character input processing which has been performed according to the operation of the key, by using the character font data in the host section; and notifying character input processing result data at which, when a character input processing termination key in the operating section is operated, the host section notifies result data of a series of character input processing, to the engine section.

According to a second aspect, the present invention is a communication terminal comprising: a host section which includes a host processor, and performs a processing associated with a communication with an outside; an operating input section which is connected to the host section, and in which, a plurality of keys is arranged, and an engine section which includes an engine processor, and executes an application under a control of the host section; wherein the engine section includes a character input processing requesting means which makes a character input processing request to the host section, during execution of the application, and a character display means which receives a character input processing result from the host section, and displays characters corresponding to the character input processing result, by using character font data in the engine section, and the host section includes a character input processing result notifying means which performs a character input processing, and notifies a character input processing result to the engine section.

In this communication terminal, when a character input is necessary during execution of the application in the engine section, the character input processing requesting means of the engine section makes the character input processing request to the host section. When the host section receives this character input processing request, the character input processing result notifying means performs the character input processing, and notifies the character input processing result to the engine section. In the engine section which has received the character input processing result, the character display means displays characters corresponding to the character input processing result, by using the character font data in the engine section.

In other words, in the communication terminal of the present invention, by using the coordination operation method of the present invention described above, it is possible to carry out character input for the application which is executed in the engine section. Consequently, according to the communication terminal of the present invention, it is possible to structure the entire apparatus compactly, and to improve the convenience for the user.

In the communication terminal of the present invention, an arrangement may be made such that whenever a key for character input in the operating section is operated, the character input processing result notifying means notifies a result of a character input processing which is performed according to the operation of the key, to the engine section.

Moreover, in the communication terminal of the present invention, the character input processing result notifying means can be let to comprise: a host character input processing means which, whenever a key for character input in the operating section is operated, performs a character input processing while displaying a result of the character input processing performed according to the operation of the key, by using the character font data in the host section; and a character input processing result data notifying means which, whenever a character input processing termination key in the operating section is operated, notifies a result data of a series of character input processing to the engine section.

Moreover, in the communication terminal of the present invention, the host section may be let to comprise a wireless communication section, which is connected to the host processor, and which carries out a wireless communication with a base station of a mobile communication network. In other words, the communication terminal of the present invention may be let to be a mobile communication terminal such as a cellular phone.

As it has been described above, according to the coordination operation method and the communication terminal of the present invention, it is possible to structure the entire apparatus compactly, and to improve the convenience for the user.

BRIEF DESCRIPTION OF DRAWINGS

FIG. 1A shows schematically a front-side external view of a cellular phone according to a first embodiment of the present invention;

FIG. 1B shows schematically a right side external view of the cellular phone according to the first embodiment of the present invention;

FIG. 1C shows schematically a rear-side external view of the cellular phone according to the first embodiment of the present invention;

FIG. 2 is a block diagram for describing a functional structure of the cellular phone in FIG. 1A to FIG. 1C;

FIG. 3 is a diagram for describing a content of a non-volatile area in a storage section of a host section in FIG. 2;

DETAILED DESCRIPTION

First Embodiment

Figure 4:
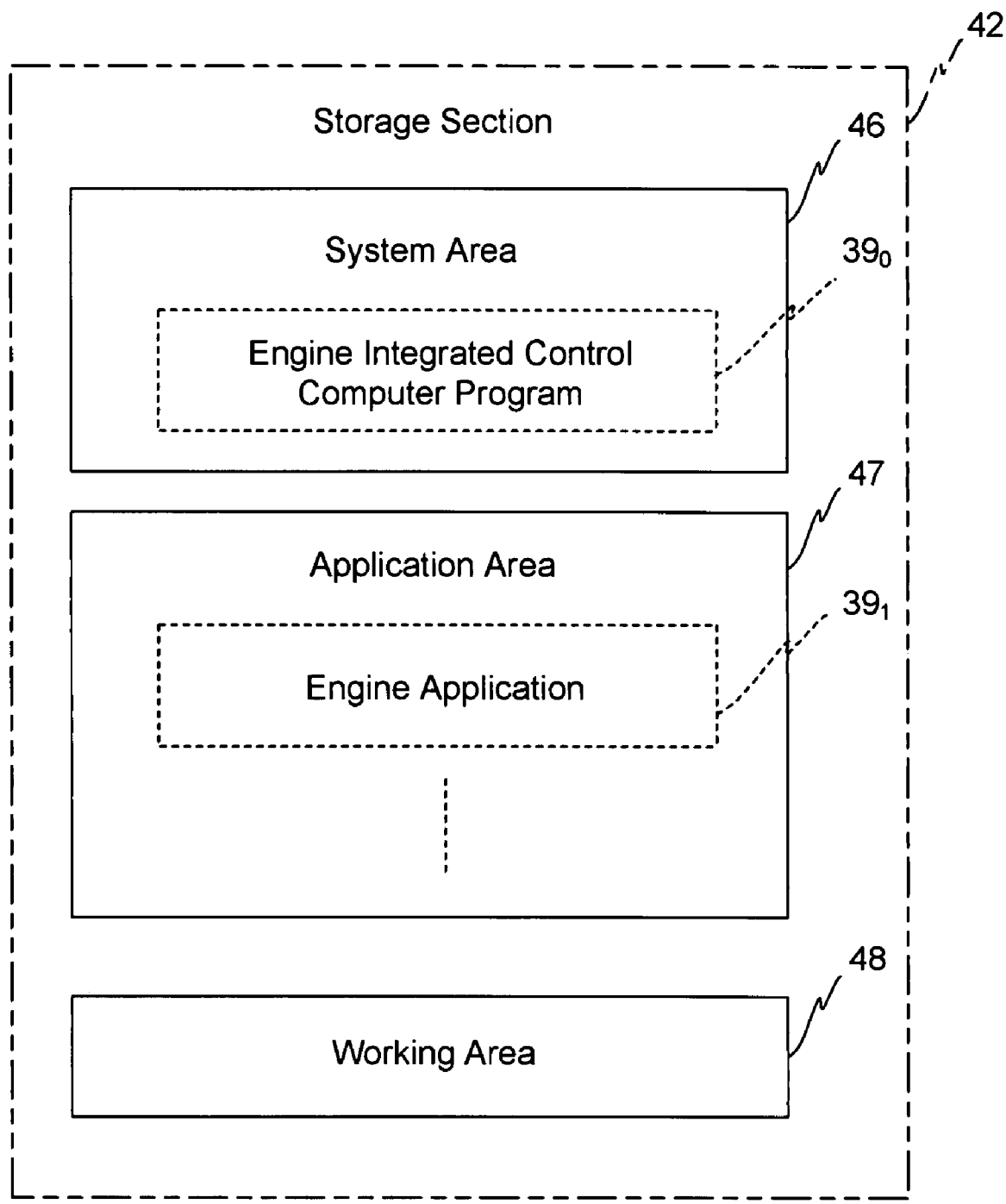
FIG. 4 is a diagram for describing a structure of a storage section of an engine section in FIG. 2.

To start with, a first embodiment of the present invention will be described below by referring to FIG. 1A to FIG. 11. In these diagrams, same reference numerals are assigned to similar or same components, and the repeated description is omitted.

In FIG. 1 and FIG. 2, a structure of a cellular phone 10 which is a communication terminal according to the first embodiment is shown schematically. The cellular phone 10 is a foldable cellular phone of a so-called clam-shell type. Here, a front-side external view of the cellular phone 10 in an opened state is shown in FIG. 1A, a right side external view of the cellular phone 10 in the opened state is shown in FIG. 1B, and a rear-side external view of the cellular phone 10 in the opened state is shown in FIG. 1C. Moreover, in FIG. 2, a functional block structure of the cellular phone 10 is shown.

As shown in FIG. 1, the cellular phone 10 includes the first portion 11, and the second portion 12 which is rotatable with respect to the first portion 11, with an axis AX1 as a central axis.

In the first portion 11, (a) an operating section 21 in which, operation keys such as a numerical keypad and function keys are arranged, and (b) a microphone 22 for inputting voice at the time of telephonic conversation are disposed as shown in FIG. 1A. Moreover, when a surface of the first portion 11 on which the operating section 21 is disposed is let to be a front surface, on a rear surface thereof, (c) a speaker for guidance 26S for generating a ring tone and an instruction tone is disposed as shown in FIG. 1C.

In the second portion 12, (a) a main display section 25M which displays operation instructions, an operating condition, a message received, an imaging result by an imaging section 29 which will be described later, and an image or the like by an engine application, (b) a speaker 26M which reproduces an audio signal which is transmitted from a communication counterpart at the time of telephonic conversation, and (c) an LED (Light Emitting Diode) 27 for evoking attention of a user, are disposed as shown in FIG. 1A. Moreover, when a display surface of the main display section 25M in the second portion 12 is let to be a front surface, on a rear surface thereof, (d) a sub-display section 25S which performs an auxiliary display, and (e) the imaging section 29 which captures an image in a field of view of an image-forming optical system, are disposed as shown in FIG. 1C.

Moreover, as shown in FIG. 2, the cellular phone 10 further includes (f) a vibrator 24 for notifying the user an incoming call by vibrating the cellular phone 10 when there is an incoming call, and (g) an acceleration and attitude sensor 28 for detecting an acceleration of the cellular phone 10, and an attitude of the cellular phone 10. The vibrator 24 and the acceleration and attitude sensor 28 are disposed inside the cellular phone 10.

Furthermore, the cellular phone 10 includes (j) a host section 30 for carrying out basic functions as a cellular phone, such as a conversation function, and (k) an engine section 40 which carries out execution of an engine application. The host section 30 and the engine section 40 are disposed inside the cellular phone 10.

The host section 30 includes a host processor 31 which performs an integrated control of the overall cellular phone 10, a wireless communication section 32 for transmitting and receiving a communication signal via an antenna 33, and a storage section 35 which stores computer programs and data. The operating section 21, the microphone 22, the speaker for instructions 26S, the LED 27, the sub display section 25S, and the vibrator 24 described above are also connected to the host processor 31.

A central processing unit (CPU) function and a digital signal processor (DSP) function are installed in the host processor 31. Moreover, by executing upon reading a computer program for host 38 (refer to FIG. 3) stored in the storage section 35, by the host processor 31, basic function operations such as a communication function operation, and an exchange of various data between the host processor 31 and the engine section 40 are performed.

The storage section 35 includes a volatile area 36 for storing temporarily various data, and a non-volatile area 37 for storing permanently computer programs etc. The volatile area 36 is formed by a volatile storage element of which, the storage content is not secured when the electric power for operation is not supplied. Moreover, the non-volatile area 37 is formed by a non-volatile storage element of which, the storage content is secured even when the electric power for operation is not supplied. Here, in the non-volatile area 37, an engine integrated control computer program $39_0$, and engine applications $39_1$, $39_2$, ..., $39_N$ are stored in addition to the computer program for host 38 as shown in FIG. 3.

Coming back to FIG. 2, the engine section 40 includes an engine processor 41 which performs an integrated control of the entire engine section 40, and a storage section 42 which stores data and computer programs executed by the engine processor 41. Here, the storage section 42 is connected to the engine processor 41. Moreover, the main display section 25M and the speaker 26M described above are connected to the engine processor 41.

The storage section 42 is formed by a volatile storage element of which, the storage content is not secured when the electric power for operation is not supplied. Here, the storage section 42, as shown in FIG. 4, includes a system area 46 in which, the engine integrated control computer program $39_0$ describe above is stored, an engine application area 47 in which, at least any one or more of the engine applications $39_k$ (k=1, 2, . . . ) is stored, and an area for working 48 which is used by the engine integrated control computer program $39_0$ and the engine application being executed. The engine integrated control computer program $39_0$ is loaded from the host section 30 to the engine section 40 at the time of initialization of the apparatus, and the engine application $39_k$ is loaded from the host section 30 to the engine section 40 according to a user's command.

Figure 5:
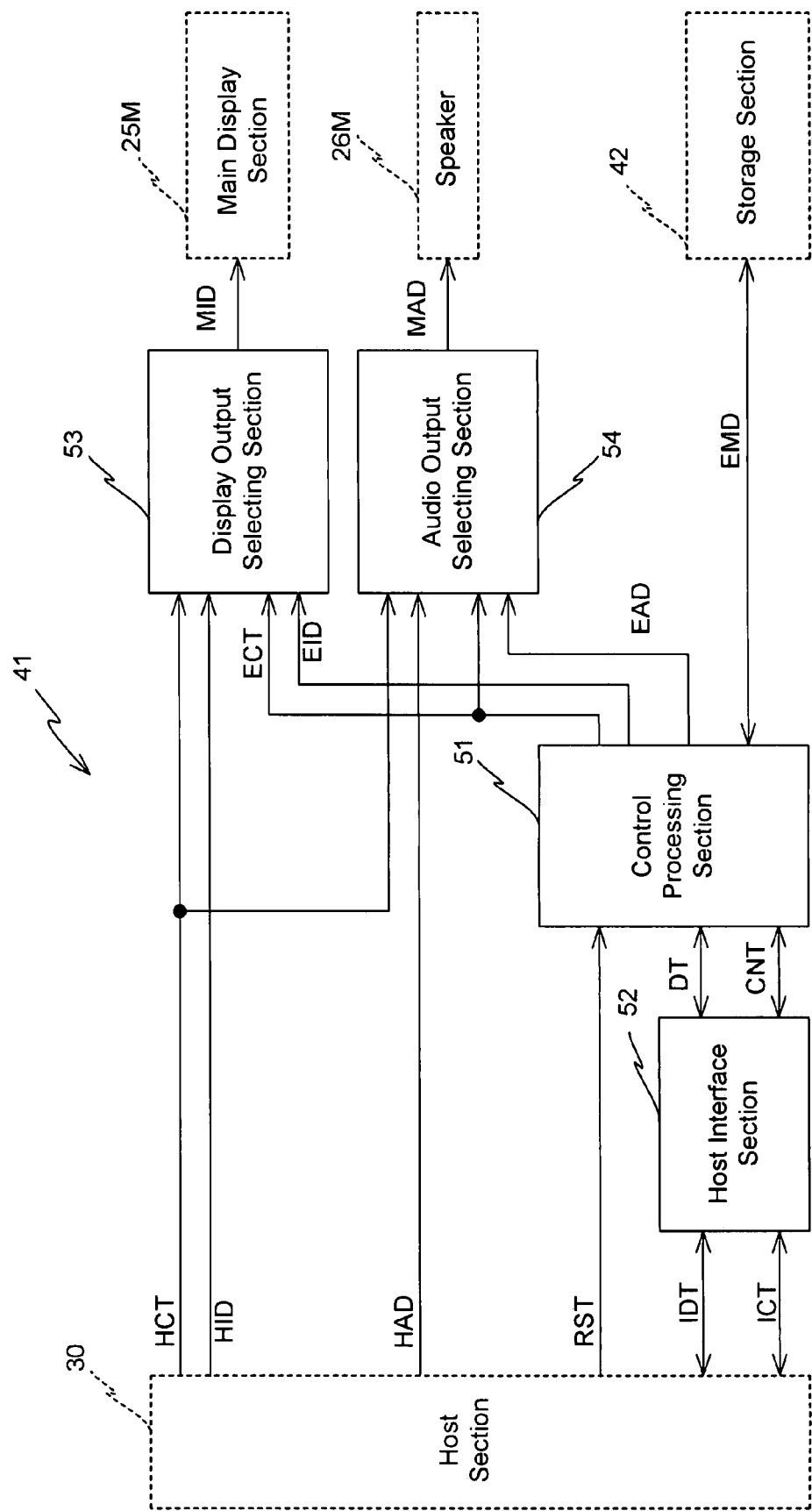
FIG. 5 is a block diagram for describing a structure of an engine processor in FIG. 2.

The engine processor 41, as shown in FIG. 5, includes a control processing section 51, and a host interface section 52. Moreover, the engine processor 41 includes a display output selecting section 53 for supplying to the main display section 25M upon selecting any one of a host display image signal HID from the host section 30, and an engine display image signal EID from the control processing section 51, as a display image signal MID to be supplied to the main display section 25M. Furthermore, the engine processor 41 includes an audio output selecting section 54 for supplying to the speaker 26M upon selecting, any one of a host audio signal HAD from the host section 30, and an engine audio signal EAD from the control processing section 51, as an audio signal MAD to be supplied to the speaker 26M.

The control processing section 51 executes the engine integrated control computer program $39_0$, and executes any one of the engine applications $39_1$, $39_2$, . . . under the control of the engine integrated control computer program $39_0$. The control processing section 51 has a three-dimensional graphic processing function and a sound generation processing function, and exhibits the three-dimensional graphic processing function and the sound generation processing function at the time of executing any one of the engine applications $39_1$, $39_2$, . . . .

The host interface section 52 is located between the host section 30 and the control processing section 51, and performs buffering of various data and various commands transferred to an from the host section 30, and acts as an interface between various control signals. The host interface section 52 has a two-port RAM (Random Access Memory) device.

In the host interface section 52, at one port of the two-port RAM device, it is connected to the control processing section 51 by an internal data signal DT and an internal control signal CNT. Here, the internal control signal CNT includes signals such as an internal write command signal to the two-port RAM device and an internal read command signal from the two-port RAM device, which the control processing section 51 issues and sends forth toward the host interface section 52. Moreover, the internal control signal CNT includes signals such as an internal interrupt signal which indicates that data has been sent from the host section 30 toward the engine section 40, which the host interface section 52 issues toward the control processing section 51.

Moreover, in the host interface section 52, at the other port of the two-port RAM device, it is connected to the host section 30 by an interface control signal ICT and an interface data signal IDT of 8-bit parallel for example. Here, the interface control signal ICT includes signals such as an interface write command signal to the two-port RAM and an interface read command signal from the two-port RAM, which the host section 30 issues toward the host interface section 52. Moreover, the interface control signal ICT includes signals such as an interface interrupt signal which indicates that data has been sent from the engine section 40 toward the host section 30, which the host interface section 52 issues toward the host section 30.

By exchanging the signals as described above, responses and commands associated with adjunct data according to the requirement are transferred between the host section 30 and the engine section 40 via the host interface section 52.

In the display output selecting section 53, one of the host display image signal HID and the engine display image signal EID is selected and output as follows, as the display image signal MID, in accordance with instructions by (from) the host output control signal HCT from the host section 30, and the engine output control signal ECT from the control processing section 51. Here, when a priority display of a host image is specified by the host output control signal HCT, the display output selecting section 53 selects the host display image signal HID, and outputs as the display image signal MID, irrespective of the instruction from the engine output control signal ECT. On the other hand, when the priority display of the host screen is not specified by the host output control signal HCT, the display output selecting section 53 selects one of the host display image signal HID and the engine display image signal EID, as the display image signal MID, according to the instruction by the engine output control signal ECT.

In other words, in the display output selecting section 53, when the priority display of the host screen is not specified by the host output control signal HCT, but the display of the engine screen is specified by the engine output control signal ECT, the engine display image signal EID is selected and output as the display image signal MID. Moreover, in the display output selecting section 53, when the priority display of the host screen is not specified by the host output control signal HCT, and also the display of the engine screen is not specified by the engine output control signal ECT, the display output selecting section 53 selects the host display image signal HID, and outputs as the display image signal MID.

In the audio output selecting section 54, similarly as in the display output selecting section 53 as described above, one of the host audio signal HAD and the engine audio signal EAD is selected and output as the audio signal MAD, in accordance with an instruction from the host output control signal HCT and the engine output control signal ECT. In other words, when a priority output of a host audio is specified by the host output control signal HCT, the audio output selecting section 54 selects the host audio signal HAD, and outputs as the audio signal MAD, irrespective of the instruction from the engine output control signal ECT. Moreover, when the priority output of the host audio is not specified by the host output control signal HCT, and an engine application audio output is specified by the engine output control signal ECT, the audio output selecting section 54 selects the engine audio signal EAD, and outputs as the audio signal MAD. Moreover, when the priority output of the host audio is not specified by the host output control signal HCT, and also the engine application audio output is not specified by the engine output control signal ECT, the audio output selecting section 54 selects the host audio signal HAD, and outputs as the audio signal MAD.

Figure 6:
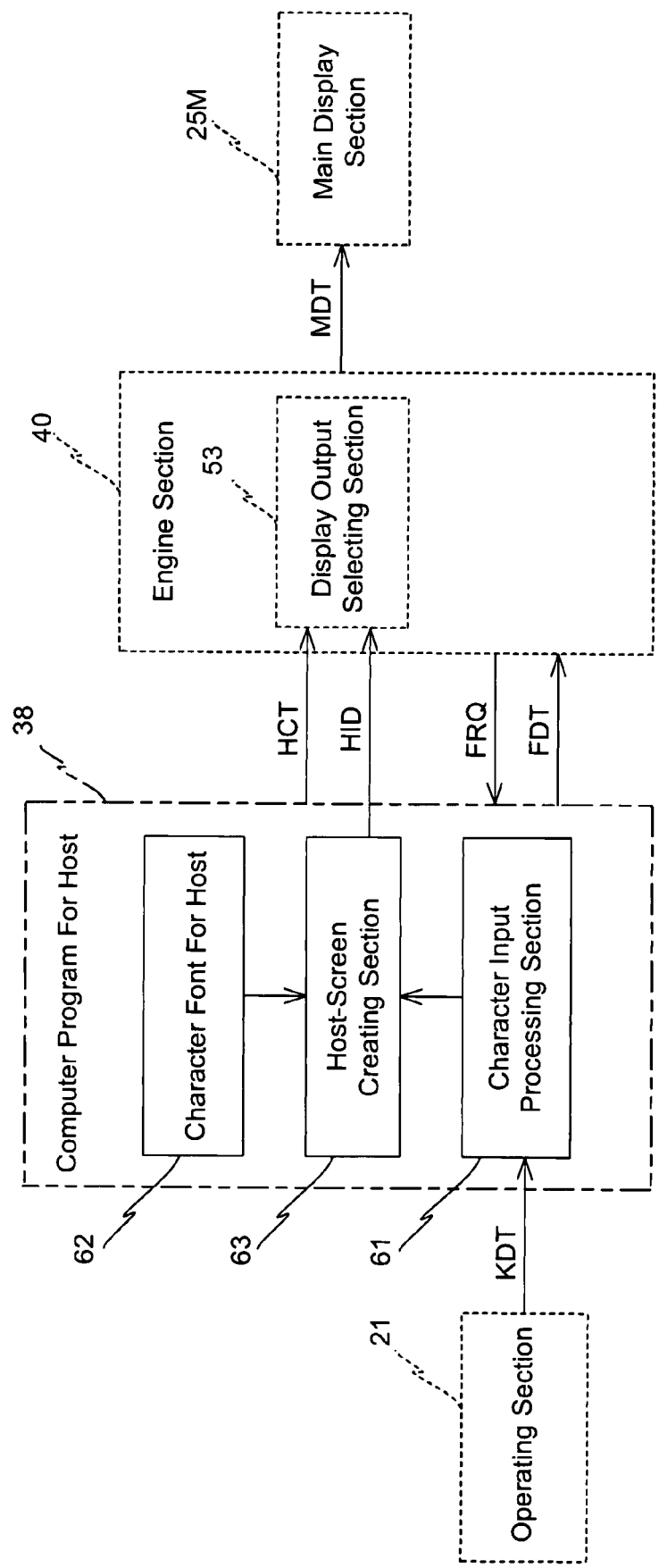
FIG. 6 is a block diagram for describing configuration of a computer program for host in the first embodiment.
Figure 7:
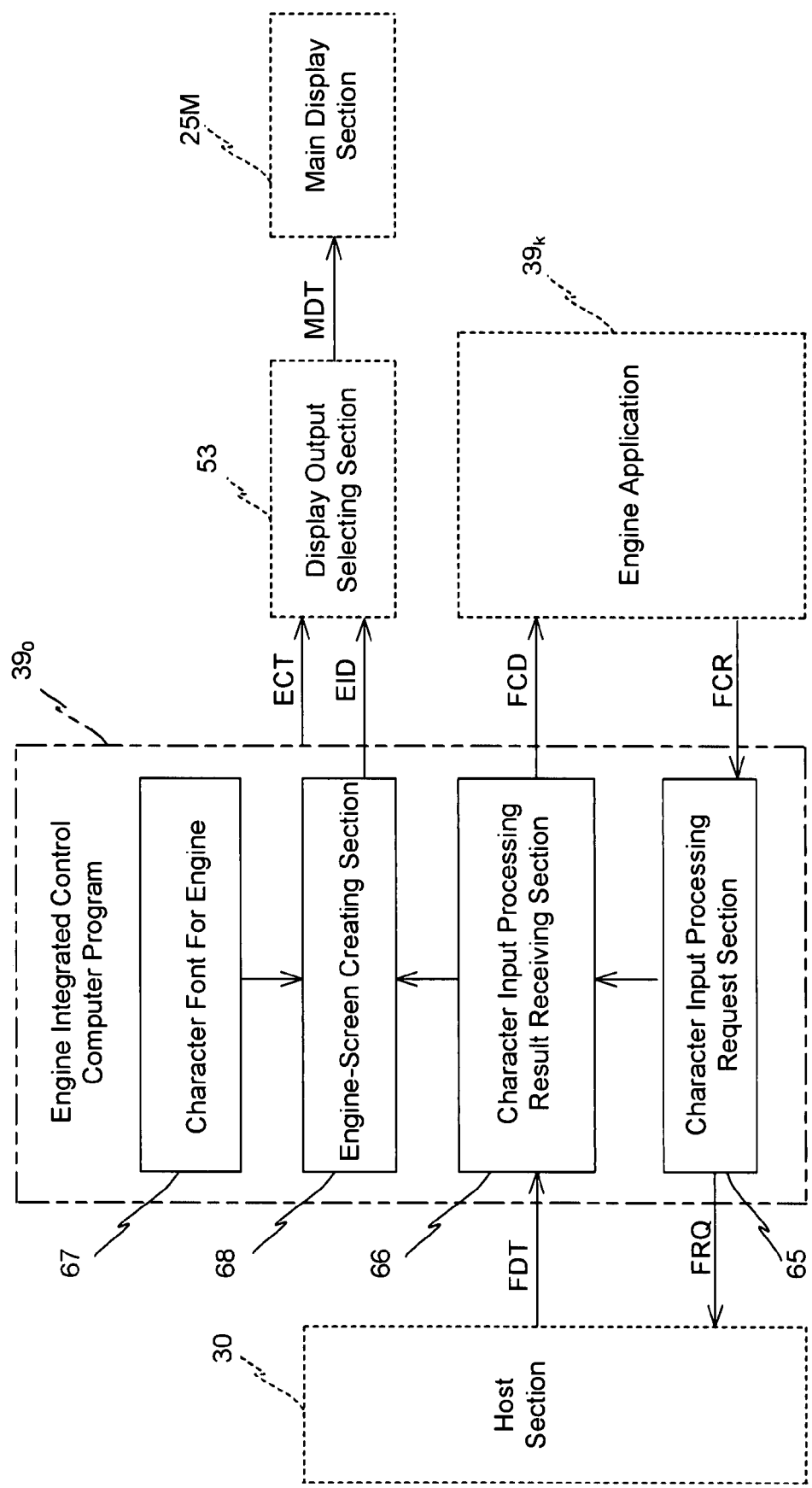
FIG. 7 is a block diagram for describing a structure of an engine integrated control computer program in the first embodiment.

The computer program for host 38, as shown in FIG. 6, includes (i) a character input processing section 61 which performs character input processing upon receiving character input data KDT from the operating section 21, (ii) a character font for host 62 which is used at the time of making a character display on the main display section 25M, as the host section 30, and (iii) a host-screen creating section 63 which, upon receiving data of a character input processing result from the character input processing section 61, creates screen data which includes the character input processing result, and outputs to the display output selecting section 53 described above, by the host display image signal HID.

Here, the character input processing section 61, in a case of a host mode in which, none of the engine applications $39_k$ (k=1, 2, ...) is being executed in the engine section 40, sends data of the character input processing result to the host-screen creating section 63. On the other hand, in a case of an engine mode in which, at least one of the engine applications $39_k$ is being executed in the engine section 40, during a time after a character input processing request FRQ is received from the engine section 40, till a command for character input processing termination is received from the operating section 21, the character input processing section 61 sends the character input processing result to the engine section 40, as data FDT, whenever a character input key is pressed on the operating section 21.

In a case of the engine mode, when the character input processing request FRQ is made from the engine section 40, when a key other than a host-specific key which is defined as a host-specific key is pressed, the computer program for host 38 sends as it is, data of input of key which is pressed, to the engine section 40. On the other hand, when a host-specific key is pressed, the computer program for host 38, without sending the data of input key which is pressed, to the engine section 40, as it is, performs processing according to the host-specific key which is pressed.

Moreover, the engine integrated control computer program $39_0$ described above, as shown in FIG. 7, includes (i) a character input processing request section 65 which, upon receiving a character input processing request FCR from the engine application $39_k$, sends the character input processing request FCR to the host section 30, (ii) a character input processing result receiving section 66 which, upon receiving a character input processing result data FDT from the host section 30, sends the character input processing result to an engine-screen creating section 68 which will be described later, and upon receiving a notification of character input processing termination from the host section 30, notifies a result of series of character input processing from the latest character input processing request FRQ, collectively to the engine application $39_k$, as character input data FCD. Moreover, the engine integrated control computer program $39_0$ includes (iii) a character font for engine 67 which is to be used at the time of making a character display on the main display section 25M as the engine section 40, and (iv) the engine-screen creating section 68 which, upon receiving data of the character input processing result from the character input processing result receiving section 66, creates screen data which includes the character input processing result, and outputs to the display output selecting section 53, by the engine display image signal EID.

Next, the character input processing in the cellular phone 10 which is structured as described above, will be described by referring mainly to FIG. 8 to FIG. 11.

[Character Input Processing at the Time of Host Mode]

Firstly, the character input processing in the host mode will be described by referring mainly to FIG. 8 and FIG. 9. In the host mode, a priority output of a host audio and a priority display of a host screen are specified by the host output control signal HCT.

Moreover, in the following description, it is assumed that an operation of creating an electronic mail body is started, and keys on the operating section 21 except the specific functions keys, are let to be the character input keys. Moreover, the following description is made assuming that character '愛' are to be input as the electronic mail body.

Figure 8:
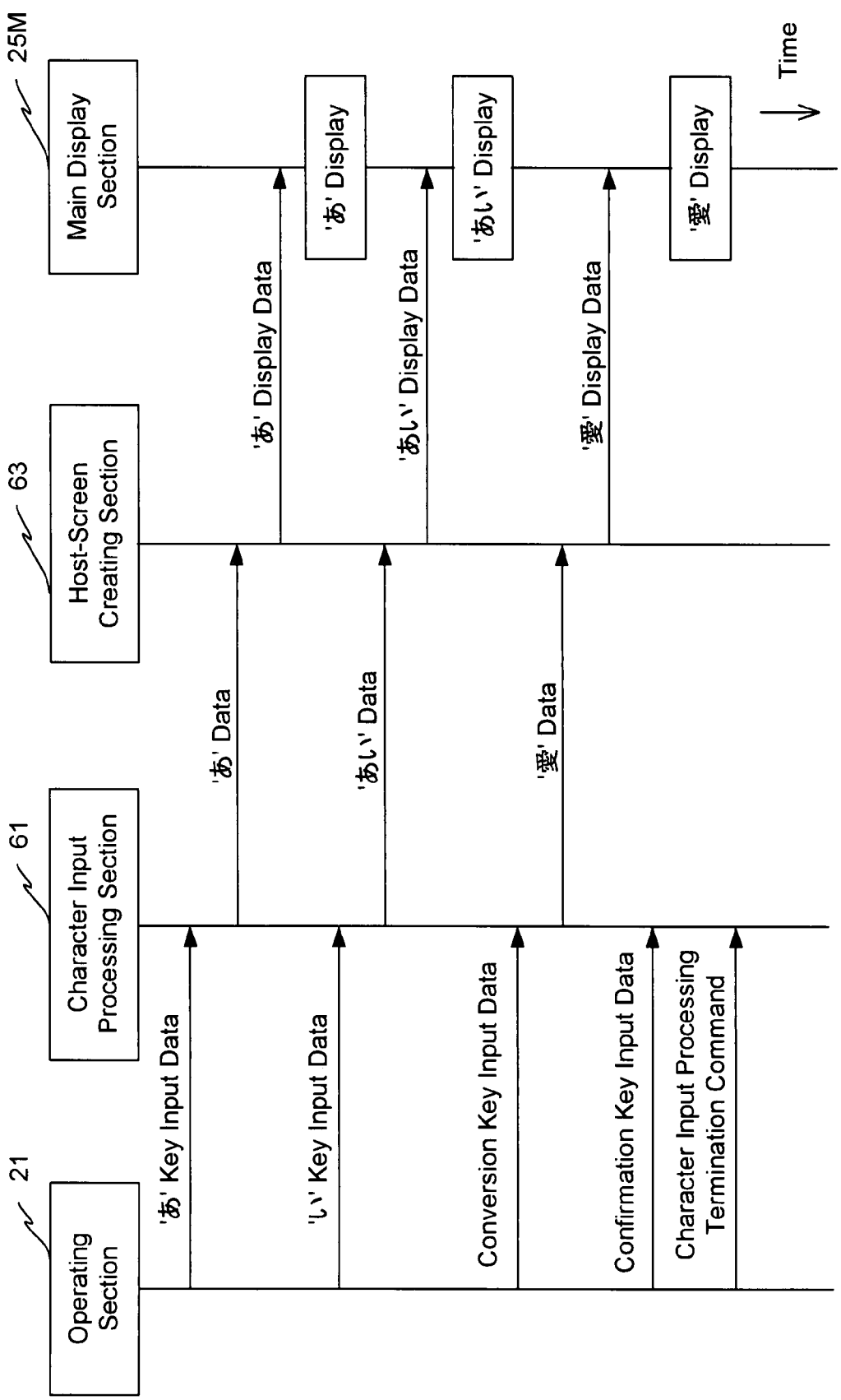
FIG. 8 is a sequence diagram for describing a character input processing at the time in a host mode.
Figure 9:
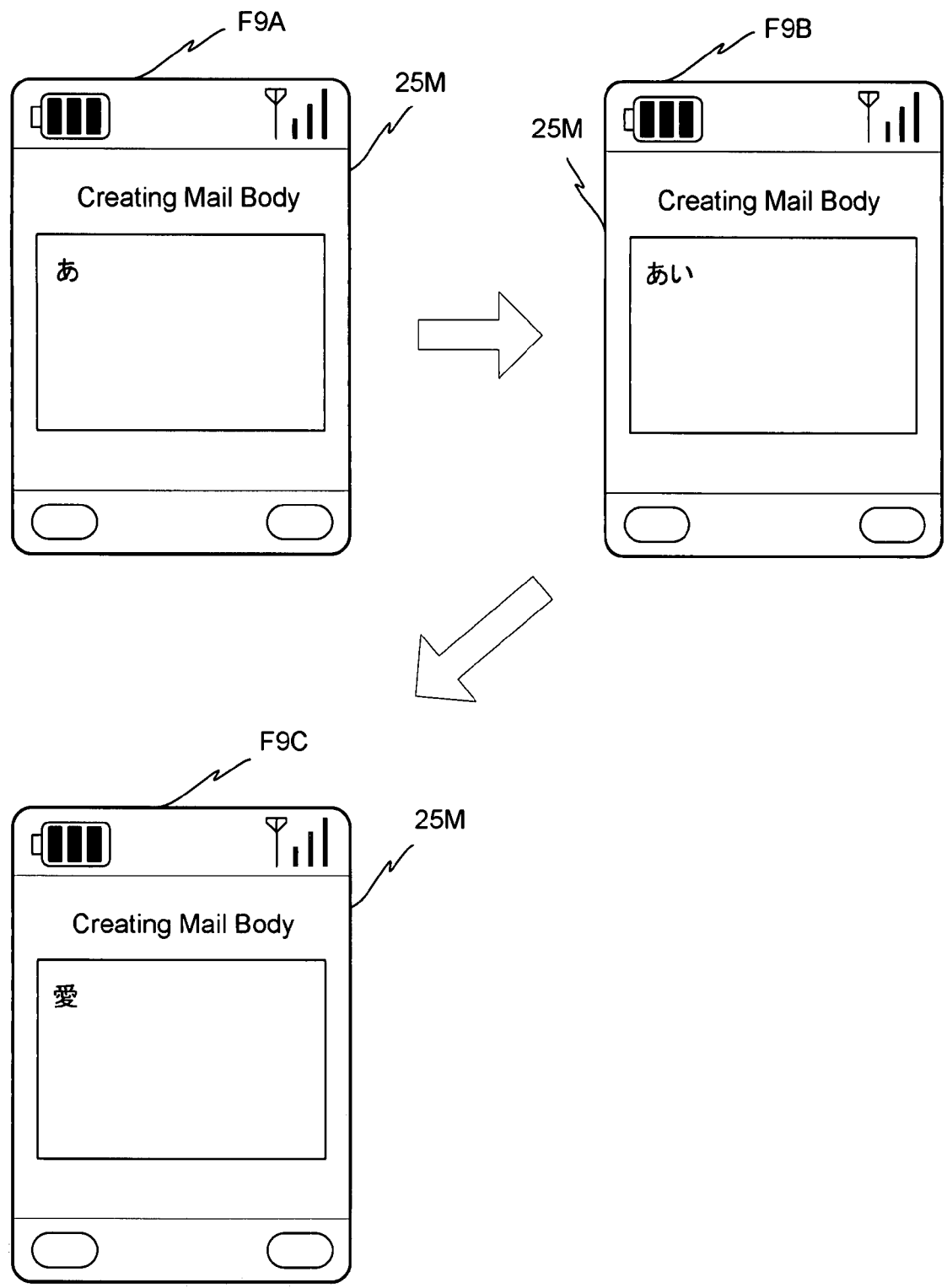
FIG. 9 shows a screen display example in the character input processing in FIG. 8.

At the time of creating the electronic mail body in the host mode, as shown in FIG. 8, when key 'あ' is pressed, 'あ' key input data is sent from the operating section 21 to the character input processing section 61 in the host section 30. The character input processing section 61 which has received the 'あ' key input data, identifies that 'あ' has been input. Further, the character input processing section 61 transmits 'あ' key input data to the host-screen creating section 63.

The host-screen creating section 63 which has received the 'あ' key input data, refers to the character font for host 62, and creates screen data displaying 'あ' on an input character display field on the screen, and transmits to the main display section 25M. As a result of this, 'a' is displayed on the screen of the main display section 25M. A display example of such 'あ' is indicated in a display F9A.

Back to FIG. 8, next, when a key 'い' is pressed, 'い' key input data is transmitted from the operating section 21 to the character input processing section 61 in the host section 30. The character input processing section 61 which has received the 'い' key input data, identifies that 'い' has been input next to 'a'. Further, the character input processing section 61 transmits 'あい' data to the host-screen creating section 63.

The host-screen creating section 63 which has received the 'あい' data, upon referring to the character font for host 62, creates screen data displaying 'あい' in the input character display field on the screen, and transmits to the main display section 25M. As a result of this, 'あい' is displayed on the screen of the main display section 25M. A display example of such 'あい' is indicated in a display F9B.

Back to FIG. 8, next, when a conversion key is pressed, conversion key input data is transmitted from the operating section 21 to the character input processing section 61 in the host section 30. The character input processing section 61 which has received the conversion key input data, carries out conversion from a Japanese kana script to Chinese pictorial kanji script of 'あい'. Here, a first conversion result is assumed to be a target conversion result '愛'. When such conversion result '愛' is achieved, the character input processing section 61 transmits '愛' data to the host-screen creating section 63.

The host-screen creating section 63 which has received the '愛' data, referring to the character font for host 62, creates screen data displaying '愛' in the input character display field on the screen, and transmits to the main display section 25M. As a result of this, '愛' is displayed on the screen of the main display section 25M. A display example of such '愛' is indicated in a display F9C.

When the first conversion result differs from the target conversion result, a user, while looking a display result on the main display section 25M, presses the conversion key repeatedly till the target conversion result is obtained.

Back to FIG. 8, when the target conversion result is achieved in such manner, the user presses a confirmation key. As a result of this, confirmation key input data is transmitted from the operating section 21 to the character input processing section 61 in the host section 30. The character input processing section 61 which has received the confirmation key input data, identifies that kana to kanji conversion has been confirmed for 'あい'.

When a plurality of final character input results is let to be there, a processing similar to a processing from 'あ' key input data to confirmation key input data, for input '愛' described above is to be performed for each character, and characters after confirmation are to be displayed in combination on the main display section 25M.

In such manner, when creating of the mail body is over, the user presses a mail-body creating termination key which also serves as a character input processing termination command key. As a result, from the operating section 21, the character input processing termination command is transmitted to the character input processing section 61. The character input processing section 61 which has received the character input processing termination command, terminates the processing. In tandem with a termination operation of the character input processing, the computer program for host 38 changes the screen of the main display section 25M to a screen before starting the mail body creating, such as a menu screen.

[Character Input Processing in Engine Mode]

Next, the character input processing in the engine mode will be described by referring mainly to FIG. 10 and FIG. 11. In the host mode, the priority output of the host audio and the priority display of the host screen are not specified by the host output control signal HCT, and an engine application audio output and an engine application image are specified by the engine output control signal ECT.

Moreover, in the engine mode, the host section 30 does not perform the character input processing till the character input processing request FRQ which will be described is received from the engine section 40, and as it has been described above, when a key in the operating section 21 except the host-specific key is pressed, input data of key which is pressed is transmitted to the engine section 40.

Moreover, in the following description, it is assumed that the engine application $39_k$ which is a game application is being executed in the engine section 40. In this engine application $39_k$, a name of a hero is specified, and the following description is made upon assuming that '愛' to be specified as the name of the hero.

Figure 10:
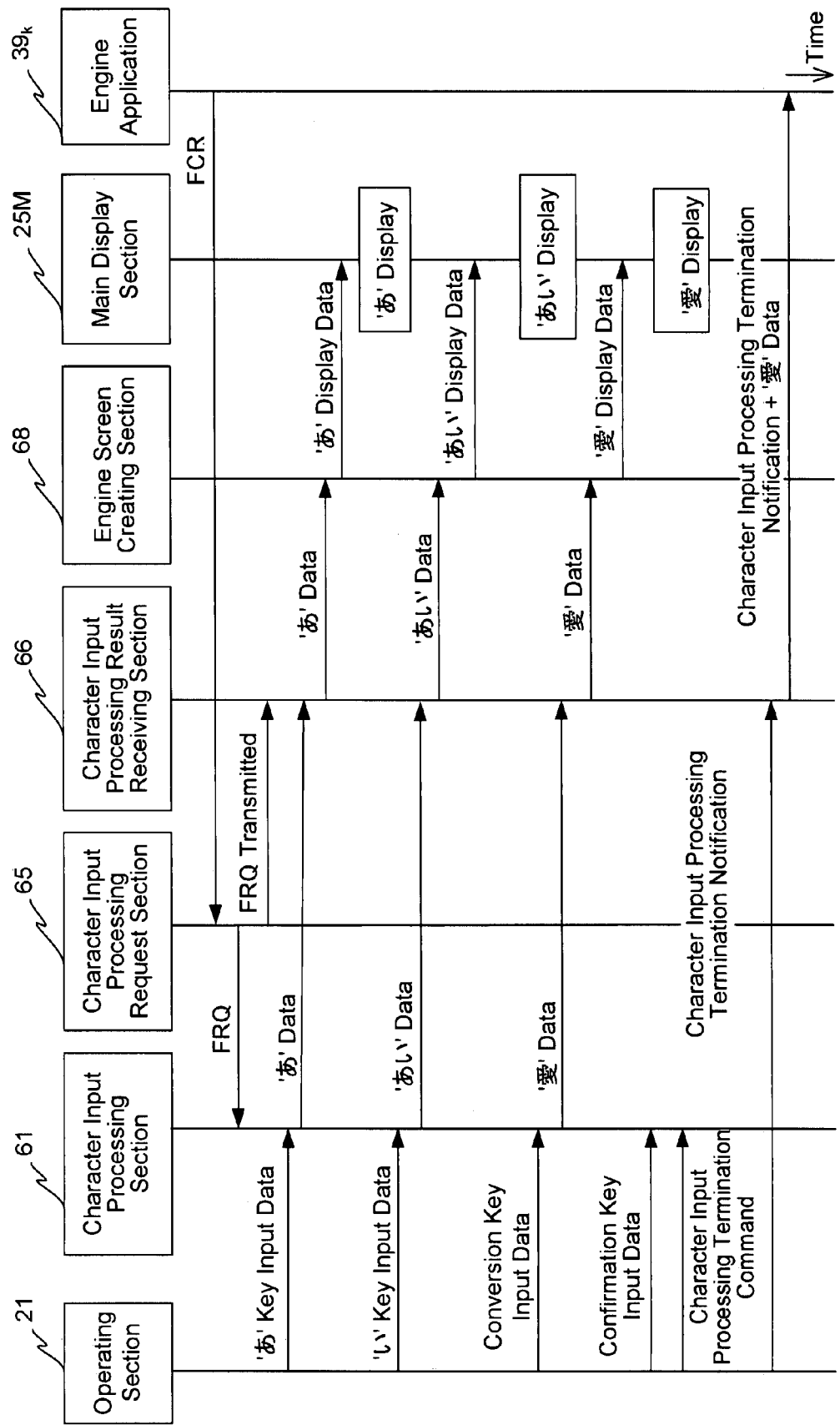
FIG. 10 is a sequence diagram for describing a character input processing at the time in an engine mode in the first embodiment.
Figure 11:
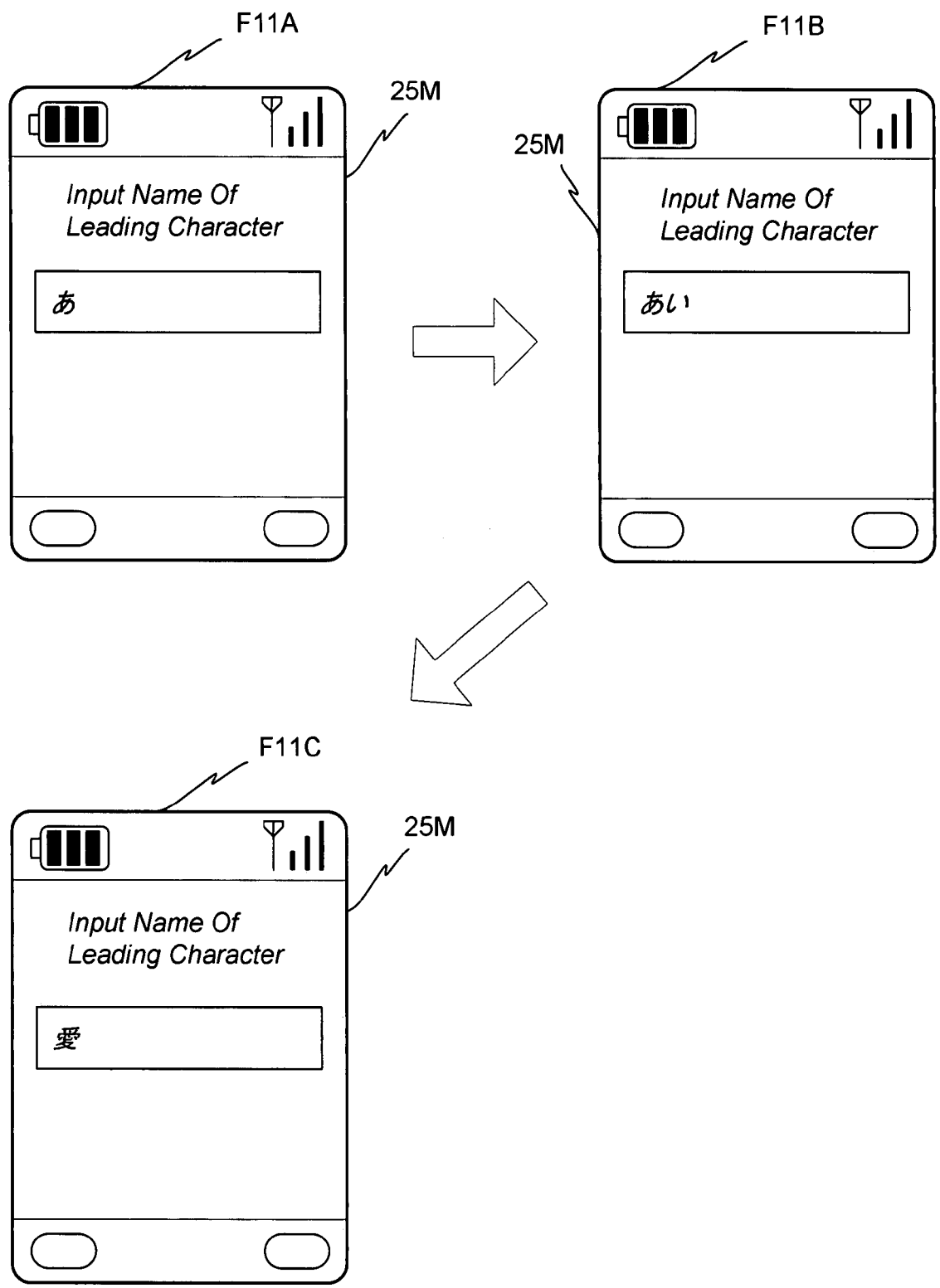
FIG. 11 shows a screen display example in the character input processing in FIG. 10.

When the name of the hero is required to be specified in the engine application $39_k$ which is being executed in the engine section 40, the engine application $39_k$ transmits to an engine integrated control computer program $30_0$, a display request for an image including a character input field, and transmits the character input request FCR, as shown in FIG. 10. In the engine integrated control computer program $30_0$, the character input processing request section 65 receives the character input request FCR.

The character input processing request section 65 which has received the character input request, transmits a character input processing request FRQ to the character input processing section 61 of the host section 30. Thereafter, the character input processing request section 65 transmits to the character input processing result receiving section 66, a notification that the character input processing request FRQ has been transmitted. As a result, the character input processing result receiving section 66 starts an operation of receiving the character input processing result.

On the other hand, the character input processing section 61 which has received the character input processing request FRQ, starts an operation of character input processing. As a result, keys of the operating section 21, except specific functions keys including the host-specific keys, function as character input keys.

In this state, when the key 'あ' is pressed, the 'あ' key input data is transmitted from the operating section 21 to the character input processing section 61 in the host section 30. The character input processing section 61 which has received the 'あ' key input data, identifies that 'あ' has been input. Next, the character input processing section 61 transmits 'あ' key input data as data FDT, to the character input processing result receiving section 66 of the engine section 40. Further, the character input processing result receiving section 66 which has received the 'a' data, transmits the 'a' data to the engine-screen creating section 68.

The engine-screen creating section 68 which has received the 'a' data, upon referring to the character font for engine 67, creates screen data which displays 'あ' in the input character display field on the screen, and transmits to the main display section 25M. As a result, 'あ' is displayed on the screen of the main display section 25M. A display example of such 'あ' is indicated in a display F11A.

Referring back to FIG. 10, next, when the key 'い' is pressed, 'あ' key input data is transmitted from the operating section 21 to the character input processing section 61 in the host section 30. The character input processing section 61 which has received the 'あ' key input data, identifies that 'い' has been input next after 'あ'. Next, the character input processing section 61 transmits 'ai' data to the character input processing result receiving section 66 of the engine section 40, as a data FDT. Further, the character input processing result receiving section 66 which has received 'あい' data transmits the 'あい' data to the engine-screen creating section 68.

The engine-screen creating section 68 which has received the 'あい' data, upon referring to the character font for engine 67, creates screen data displaying 'あい' in the input character display field on the screen, and transmits to the main body section 25M. As a result, 'あい' is displayed on the screen of the main display section 25M. A display example of such 'あい' is indicated in a display F11B.

Back to FIG. 10, next, when a conversion key is pressed, the conversion key input data is transmitted from the operating section 21 to the character input processing section 61 in the host section 30. The character input processing section 61 which has received the conversion key input data, carries out kana to kanji conversion of 'あい'. Here, similarly in a case of the character input processing in the host mode described above, the first conversion result is let to be the target conversion result '愛'. When such conversion result '愛' is achieved, the character input processing section 61 transmits '愛' data to the character input processing result receiving section 66 of the engine section 40, as a data FDT. Further, the character input processing result receiving section 66 which has received the '愛' data transmits the '愛' data to the engine-screen creating section 68.

The engine-screen creating section 66 which has received the '愛' data, upon referring to the character font for engine 67, creates screen data displaying '愛' in the input character display field on the screen, and transmits to the main display section 25M. As a result, '愛' is displayed on the screen of the main display section 25M. A display example of such '愛' is indicated in a display F11C.

Similarly as in a case of the character input processing in the host mode, when the first conversion result differs from the target conversion result, the user, while looking a display result on the main display section 25M, presses the conversion key repeatedly till the target conversion result is obtained.

Referring back to FIG. 10, when the target conversion result is achieved in such manner, the user presses the confirmation key. As a result, confirmation key input data is transmitted from the operating section 21 to the character input processing section 61 in the host section 30. The character input processing section 61 which has received the confirmation key input data, identifies that kana to kanji conversion has been confirmed for 'あい'.

When a plurality of final character input results is let to be there, a processing similar to the processing from 'a' key input data to confirmation key input data, for input '愛' described above is to be performed for each character, and characters after confirmation are to be displayed in combination on the main display section 25M.

In such manner, when specifying the name of the hero is over, the user presses a character input processing termination command key. As a result of this, from the operating section 21, the character input processing termination command is transmitted to the character input processing section 61. The character input processing section 61 which has received the character input processing termination command, terminates the character input processing, and transmits a character input processing termination notification to the character input processing result receiving section 66 of the engine section 40. The character input processing result receiving section 66 which has received the character input processing termination notification, transmits the notification that the character input processing has been terminated, attached to the '愛' data which is the final character input result, as data FCD. When the character input processing is terminated in such manner, the engine application $39_k$ executes a processing after specifying the name of the hero.

As it has been described above, in the first embodiment, when the character input becomes necessary at the time when the engine application $39_k$ is executed in the engine section 40, a character input processing request means of the engine section 40, makes the character input processing request to the host 30 according to the request from the engine application $39_k$. When the character input processing request is received, the character input processing section 61 of the host section 30 performs the character input processing, and notifies the character input processing result to the engine section 40. In the engine section 40, which has received the character input result, characters corresponding to the character input processing result are displayed by using character font data in the engine section 40. As a result of this, the engine section 40 can achieve the character input processing result without installing a front-end processor function for the character input processing. Consequently, it is possible to structure the entire apparatus compactly, and to improve the convenience for the user.

Second Embodiment

Next, a second embodiment of the present invention will be described below by referring to FIG. 12 to FIG. 15. Same reference numerals are assigned to components which are similar to or same as the components in the first embodiment, and the repeated description is omitted.

Figure 12:
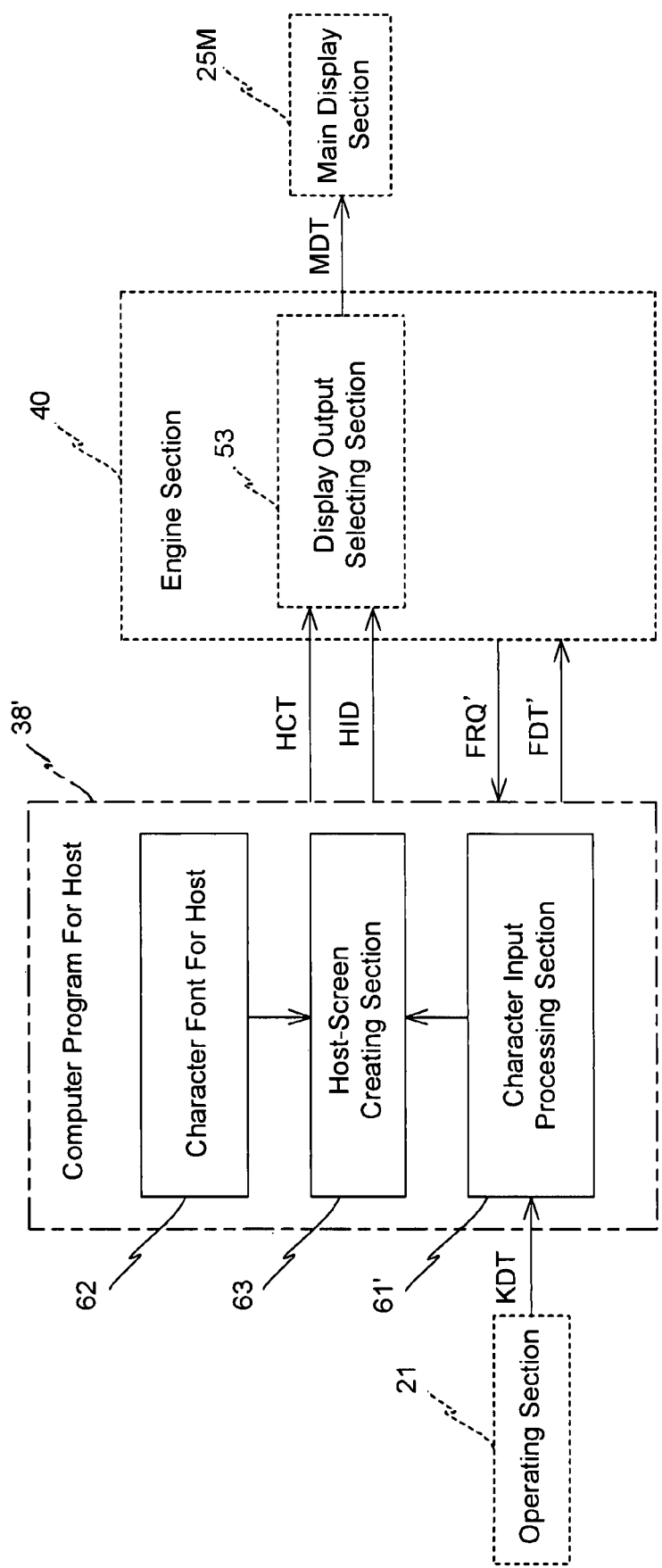
FIG. 12 is a block diagram for describing a structure of a computer program for host in the second embodiment.
Figure 13:
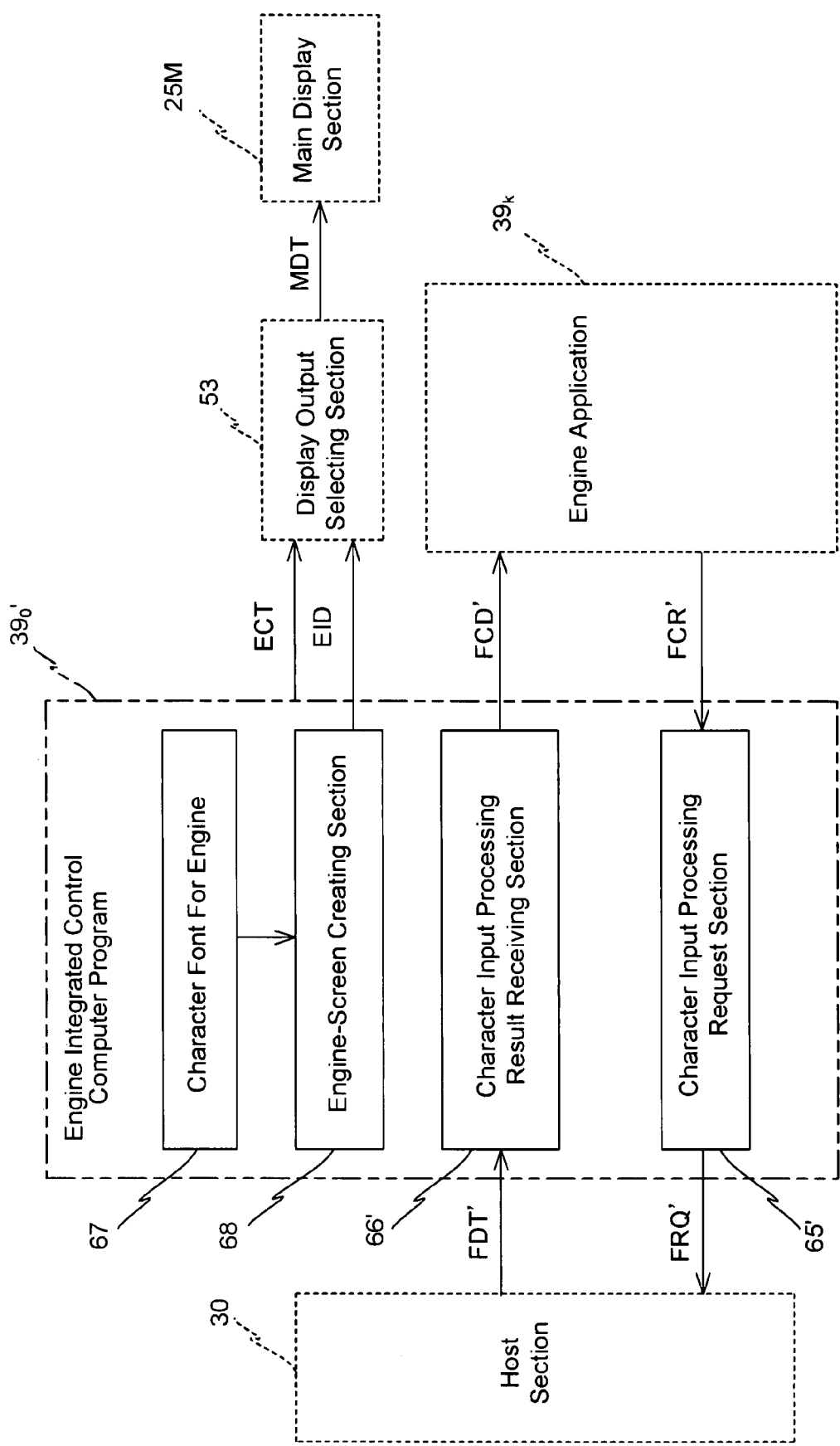
FIG. 13 is a block diagram for describing an engine integrated control computer program in the second embodiment.

In the second embodiment, a configuration of the computer program for host and a configuration of the engine integrated control computer program differ from the configurations in the first embodiment. In other words, a computer program for host 38' in this embodiment, differs from the computer program for host 38 described above, only at a point that the computer program for host 38' includes a character input processing section 61' instead of the character input processing section 61, as shown in FIG. 12. Regarding the character input processing in the host mode, this character input processing section 61' performs a processing similar to the processing in the first embodiment. Moreover, regarding the character input processing in the engine mode, the computer program for host 38' performs a processing same as in the host mode, up to pressing of the character input processing termination key, as well as transmits collectively a result of a series of character input processing, according to the pressing of the character input processing termination key, to the engine section 40.

Moreover, an engine integrated control computer program $39_0'$ in this embodiment differs from the engine integrated control computer program $39_0$ only at a point that the engine integrated control computer program $39_0'$ includes a character input processing request section 65' and a character input processing result receiving section 66', instead of the character input processing request section 65 and the character input processing result receiving section 66. The character input processing request section 65', upon receiving a character input request FCR' from an engine application $39_k$, transmits a character input processing request FRQ' along with character input guidance information, to the host section 30. Moreover, the character input processing result receiving section 66', upon receiving a character input processing termination notification along with a series of character input processing results from the host 30, performs only a processing of transmitting that the character input processing has been terminated, to the engine application $39_0'$, as data FCD, along with '愛' data which is the final character input result.

Next, an operation of the character input processing in the engine mode which is an operation an embodiment differing from a case in the first embodiment will be described below.

In the following description, similarly as in a case of the first embodiment, it is assumed that the engine application $39_k$ which is a game application is being executed in the engine section 40. In this engine application $39_k$, similarly as in the case in the first embodiment, the name of the hero is specified, and regarding specifying the name as '愛', the following description is made.

Figure 14:
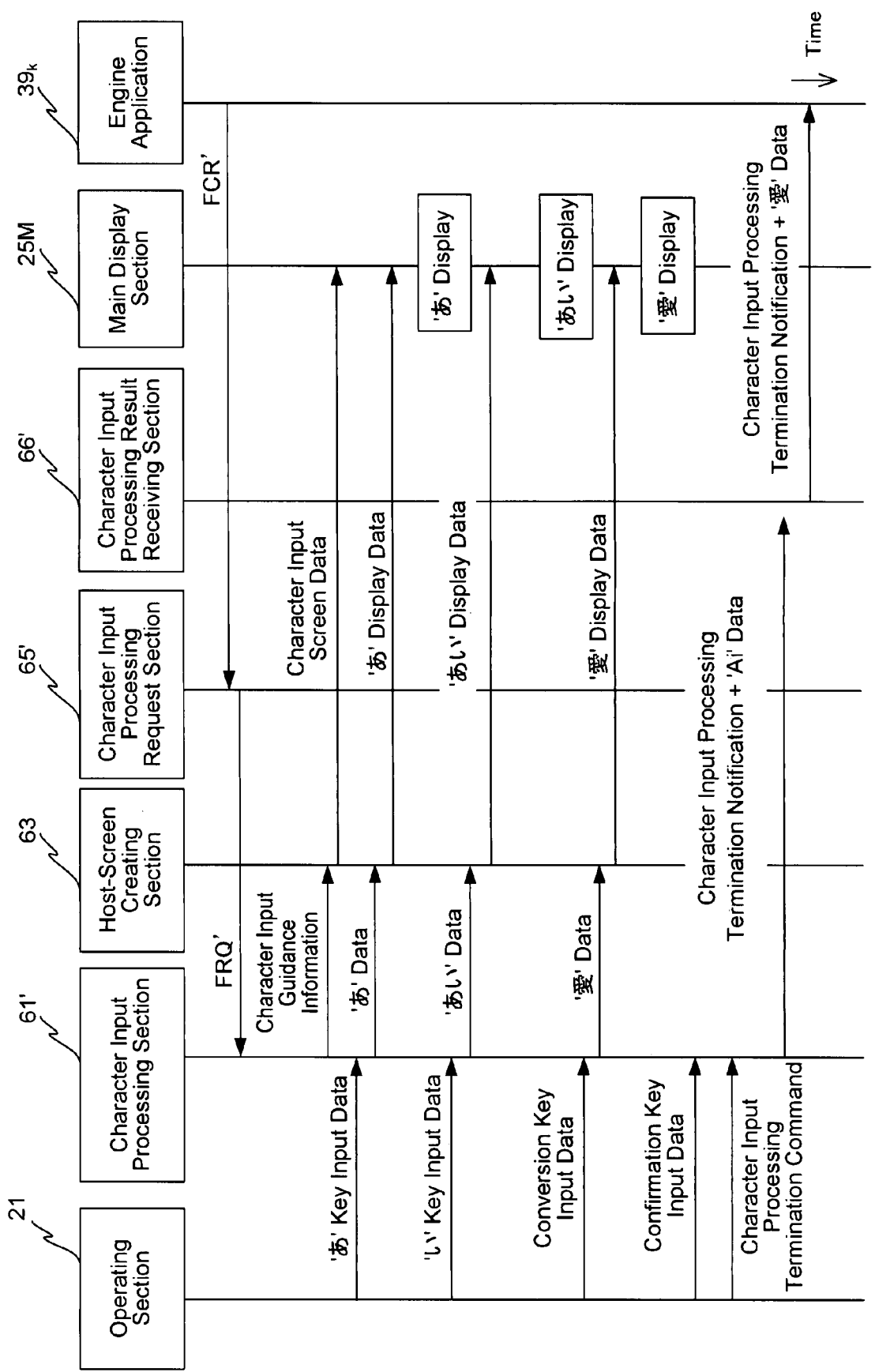
FIG. 14 is a sequence diagram for describing a character input processing at the time in an engine mode in the second embodiment.
Figure 15:
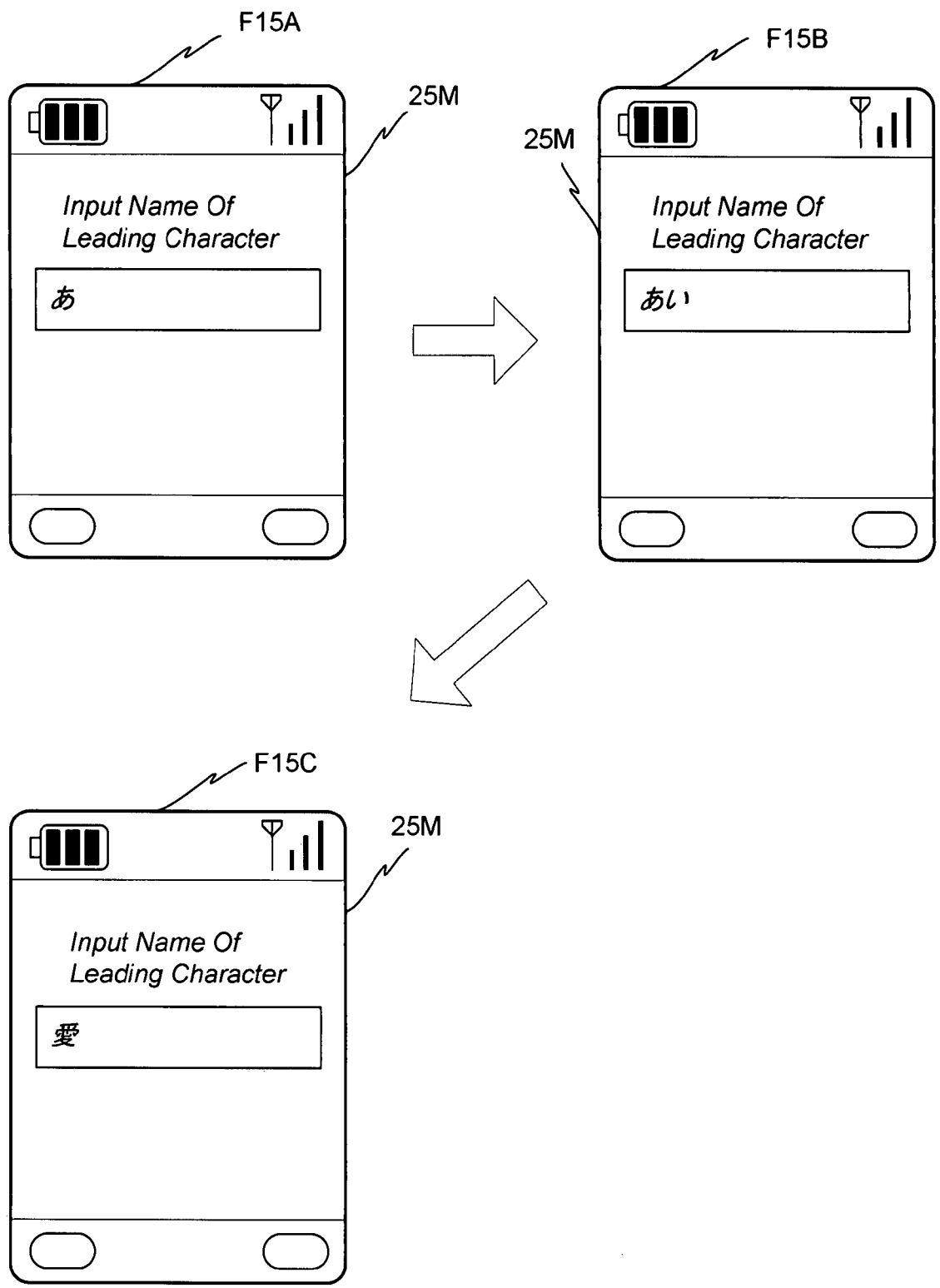
FIG. 15 shows an example of a screen display in the character input processing in FIG. 14.

When the name of the leading character is required to be specified in the engine application $39_k$ which is being executed in the engine section 40 of this embodiment, as shown in FIG. 14, the engine application $39_k$ transmits a character input request FCR' along with the character input guidance information including that the name of the leading character has been specified, and a character input field specification, to the engine integrated control computer program $39_0'$. In the engine integrated control computer program $30_0$, the character input processing request section 65' receives the character input request FCR'.

The character input processing request section 65' which has received the character input request FCR', transmits the character input processing request FRQ' along with the character input guidance information, to the character input processing section 61 of the host section 30. In the host section 30 which has received the character input processing request FRQ', a priority output of the host audio and a priority display of a host screen is specified by the host output control signal HCT. Moreover, in the host section 30' which has received the character input processing request FRQ', the character input processing section 61 transmits the character input guidance information to the host-screen creating section 53, and starts the operation of the character input processing. As a result of this, a screen in which the character input guidance information is reflected is displayed (not shown in the diagram) on the main display section 25M, and the keys of the operating section 21 except the specific function keys including the host-specific keys, function as the character input keys.

In this state, when the key 'a', the key 'い', the conversion key, and the confirmation key are pressed, similarly as in the case of the character input processing in the host mode, the 'あ' key input data, the 'い' key input data, the conversion key input data, and the confirmation key data are transmitted one by one from the operating section 21 to the character input processing section 61' in the host section 30. Further, from the character input processing section 61', the 'あ' data, the 'あい' data, and the '愛' data are transmitted one by one to the host-screen creating section 63.

Whenever each of these 'あ' data, 'あい' data and '愛' data is received, the host-screen creating section 63, upon referring to the character font for host 62, creates screen data which displays each of 'あ', 'あい' and '愛' in the character input display field on the screen, and transmits one by one to the main display section 25M. As a result, 'あ', 'あい', and '愛' are displayed one by one on the screen of the main display section 25M. Display examples of such 'あ', 'あい', and '愛' one by one are shown in a display F15A to a display F15C.

When a plurality of final character input results is let to be there, a processing similar to a processing from 'あ' key input data to confirmation key input data, for input '愛' described above is to be performed for each character, and characters after confirmation are to be displayed in combination on the main display section 25M.

Referring back to FIG. 14, in such manner, when specifying the name of the hero is terminated, the user presses the character input processing termination key. As a result of this, from the operating section 21, the character input processing termination command is transmitted to the character input processing section 61'. The character input processing section 61' which has received the character input processing termination command, terminates the character input processing, and transmits the character input processing termination notification along with '愛' data, which is a result of series of the character input processing, as data FDT', to the character input processing result receiving section 66' of the engine section 40. Moreover, the host section 30 cancels specification of the priority output of the host audio and the priority display of the host screen by the host output control signal HCT.

The character input processing result receiving section 66' which has received the character input processing termination notification, transmits that the hero input processing is over, along with '愛' data which is a result of a series of character input processing, to the engine application $39_k$, as data FCD. When the character input processing is over in such manner, the engine application $39_k$ executes a processing after the name of the leading character is specified. Further, when the display of the name of the hero becomes necessary, a display upon referring to the character font for engine 67 is made.

As it has been described above, in this embodiment, when the character input becomes necessary when the engine application $39_k$ is executed in the engine section 40, the character input processing request section 65' of the engine section 40, corresponding to the request from the engine application $39_k$, makes the character input processing request to the host section 30. Upon receiving the character input processing request, the character input processing section 61' of the host section 30, after performing a series of character input processing, notifies the result of the series of character input processing to the engine section 40. Thereafter, in the engine section 40, characters according to the character input processing result are displayed by using the character font data in the engine section 40. As a result of this, the engine section 40 can achieve the character input processing result without installing the front-end processor function for the character input processing. Consequently, it is possible to structure the entire apparatus compactly, and to improve the convenience for the user.

In the first embodiment and the second embodiment, '愛' was let to be the final character input result. However, other singular or a plurality of characters can also be let to be the final character input result. For example, when two characters such as '愛上' are let to be the final character input result, the processing from the 'あ' key input data up to the confirmation key input data, may be performed similarly for subsequent 'う' key input data, 'え' key input data, at least one conversion key input data, and the confirmation key input data. When three or more than three characters are let to be the final character input result, for each character, a processing similar to the processing from the 'a' key input data up to the confirmation key input data described above, may be performed.

Moreover, a situation in which the character input is performed may be a situation other than creating the electronic mail body and specifying the name of the leading character. Furthermore, the engine application which is to be executed in the engine section 40 is not restricted to the game application.

Moreover, in the first embodiment and the second embodiment described above, the character font for the engine was let to be included in the engine integrated control computer program $39_0$, and was let to be loaded to the engine section 40 at the time of loading the engine integrated control computer program $39_0$. In contrast, it is also possible to make an arrangement such that at the time of loading of each engine application, the character font to be used in each engine application is loaded to the engine section 40.

Further, it is also possible to arrange a non-volatile storage area in the engine section 40, and to store the character font for engine, thereby making it unnecessary to load the character font for engine from the host section 30.

Moreover, the host processor 40 can be let to be one processor, or can be let to have a two-processor structure including a processor for communication and a processor for application integration, and the control of the engine section 40 can be made to be performed by the processor for the application integration.

Furthermore, in the first embodiment and the second embodiment described above, the display output selecting section 53 and the audio output selecting section 54 are let to be built-in in the engine processor 41. However, at least one of the display output selecting section 53 and the audio output selecting section 54 can be let to be disposed outside the engine processor 41.

Moreover, in the first embodiment and the second embodiment, although the cellular phone was let to be of a clam-shell type, the present invention is also applicable to cellular phones such as a straight type, a revolver type, a sliding type and the like.

Moreover, in the first embodiment and the second embodiment, the present invention is applied to the cellular phone. However, it is needless to mention that the present invention is also applicable to other communication terminals.

Moreover, the present invention is applicable to a communication terminal which includes a host section which performs processing associated with a communication with an outside, and an engine section which executes a predetermined function under a control of the host section.

As it has been described above, a coordination operation method of the present invention is applicable to a coordination operation between the host section which includes the host processor, and performs a processing associated with the communication with an outside, and the engine section which includes the engine processor, and executes a predetermined function under the control of the host section.

What is claimed is:

1. In a cellular phone comprising an antenna and two separate programmed processors further including a host processor running an operating system program and an engine processor running an application program:

wherein the host processor runs communications functions of the cellular phone via the antenna and runs input/output of the cellular phone, the input/output further including character input; and wherein the engine processor comprises a dedicated programmed processing section running applications;

the improvement wherein the engine and the operating system are constructed such that when character input is required by an application running on the engine processor, the character input is processed by the host processor and then passed to the engine processor for display according to the application being executed by the engine processor, and font display data originates in the application and does not originate in the host processor;

whereby the application and the engine processor require no built-in character input.

2. The improvement according to claim 1, wherein whenever a key for character input in the operating processor is operated, a character input processing result notifying means notifies a result of a character input processing which is performed according to the operation of the key, to the engine processor.

3. The improvement according to claim 1, wherein a character input processing result notifying means includes a host character input processing means which, whenever a key for character input in the operating processor is operated, performs a character input processing while displaying a result of the character input processing performed according to the operation of the key, by using the character font data in the host processor, and a character input result data notifying means which, whenever a character input processing termination key in the operating section is operated, notifies a result data of a series of character input processing to the engine processor.

4. The improvement according to claim 1, wherein the host processor includes a wireless communication section, which is connected to the host processor, and which carries out a wireless communication with a base station of a mobile communication network.

5. In a method for operating a cellular phone comprising an antenna and two separate programmed processors further including a host processor running an operating system program, and an engine processor running an application program, the method including steps of running communications functions of the cellular phone via the antenna and running input/output of the cellular phone on the host processor, the input/output further including character input; and providing that the engine processor comprises a dedicated programmed processing section running applications;

the improvement comprising additional steps of when character input is required by an application running on the engine processor, processing the character input in the host processor and then passing the character input to the engine processor for display according to an application being executed by the engine processor, and originating font display data originates in the application and not originating font display data in the host processor;

whereby the application and the engine processor require no built-in character input method.

6. The improvement according to claim 5, wherein at the step of processing the character input, whenever a key for character input is operated from an operating section which is connected to the host processor, the host processor notifies result data of the character input which has been performed according to the operation of the key, to the engine processor.

7. The improvement according to claim 5, wherein the step of processing comprises steps of processing host character input at which, whenever a key for character input in an operating section which is connected to the host processor is operated, the host processor displays a result of character input processing which has been performed according to the operation of the key, by using the character font data in the host processor and notifying character input result data at which, when a character input processing termination key in the operating section is operated, the host processor notifies result data of a series of character input processing, to the engine processor.

* * * * *